(12) United States Patent
Neumann et al.

(10) Patent No.: US 11,431,713 B2
(45) Date of Patent: Aug. 30, 2022

(54) METHODS, APPARATUS, AND SYSTEM FOR CONTROLLING ACCESS TO A LOCAL NETWORK

(71) Applicant: INTERDIGITAL CE PATENT HOLDINGS, Paris (FR)

(72) Inventors: Christophe Neumann, Rennes (FR); Siegfried Loeffler, Paris (FR); Stephane Onno, Saint Gregoire (FR); Olivier Heen, Domloup (FR); Eiwan Le Merrer, Rennes (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 404 days.

(21) Appl. No.: 16/463,342

(22) PCT Filed: Nov. 16, 2017

(86) PCT No.: PCT/EP2017/079434
§ 371 (c)(1),
(2) Date: May 22, 2019

(87) PCT Pub. No.: WO2018/095799
PCT Pub. Date: May 31, 2018

(65) Prior Publication Data
US 2019/0356664 A1    Nov. 21, 2019

(30) Foreign Application Priority Data

Nov. 22, 2016  (EP) .................................... 16306531

(51) Int. Cl.
*H04L 29/06*   (2006.01)
*H04L 9/40*    (2022.01)
*H04W 12/08*   (2021.01)

(52) U.S. Cl.
CPC ............. *H04L 63/10* (2013.01); *H04W 12/08* (2013.01)

(58) Field of Classification Search
CPC ...... H04L 63/10; H04W 12/08; H04W 12/50; H04W 48/16; H04W 84/12
(Continued)

(56) References Cited

U.S. PATENT DOCUMENTS 6,823,461 B2   11/2004  Narayanan et al.
7,346,772 B2   3/2008   Rebo et al.
(Continued)

FOREIGN PATENT DOCUMENTS

CN   1901449 B     5/2010
CN   106105132 A   11/2016
(Continued)

*Primary Examiner* — Jeffrey C Pwu
*Assistant Examiner* — Nega Woldemariam
(74) *Attorney, Agent, or Firm* — Volpe Koenig

(57) ABSTRACT

The invention relates to a method for controlling access to a first network, comprising receiving, by a first network access device of the first network, an access request from a visiting user device, determining, by the first network access device, if the visiting user device was granted an access to the first network, if the visiting device has not been granted an access to the first network, determining if there is a second network access device that granted the visiting user device an access to a second network and the second network access device is linked to the first network access device, and if the second network access device exists, granting the visiting user device an access to the first network by the first network access device.

10 Claims, 3 Drawing Sheets

(58) Field of Classification Search
USPC .............................................................. 726/3
See application file for complete search history.

(56) References Cited

U.S. PATENT DOCUMENTS

| | | | |
|---|---|---|---|
| 8,386,770 B2 | 2/2013 | Ghittino et al. | |
| 8,566,926 B1 | 10/2013 | Schnellbacher et al. | |
| 9,344,421 B1 | 5/2016 | Chen et al. | |
| 2009/0165091 A1 | 6/2009 | Liang | |
| 2013/0208693 A1 | 8/2013 | De La Forest Divonne et al. | |
| 2014/0153555 A1 | 5/2014 | Gupta | |
| 2015/0249954 A1 | 9/2015 | Patil et al. | |
| 2016/0021205 A1* | 1/2016 | Mower | H04L 43/10 709/224 |
| 2016/0044720 A1 | 2/2016 | Boucher | |
| 2016/0135116 A1* | 5/2016 | Chen | H04W 48/20 455/450 |
| 2016/0149916 A1 | 5/2016 | Lindheimer et al. | |
| 2017/0078880 A1* | 3/2017 | Likar | H04L 63/08 |
| 2018/0343252 A1* | 11/2018 | Evesti | H04W 8/24 |

FOREIGN PATENT DOCUMENTS

| | | |
|---|---|---|
| KR | 20140066626 | 6/2014 |
| WO | WO2015153924 | 10/2015 |

\* cited by examiner

METHODS, APPARATUS, AND SYSTEM FOR CONTROLLING ACCESS TO A LOCAL NETWORK

This application claims the benefit under 35 U.S.C. § 371 of International Application PCT/EP2017/079434, filed Nov. 16, 2017, which was published in accordance with PCT Article 21(2) on May 31, 2018, in English, and which claims the benefit of European Patent Application No. 16306531.1, filed on Nov. 22, 2016.

1. TECHNICAL FIELD

The present invention relates generally to the field of access control to local networks.

2. BACKGROUND ART

The access to wireless home networks is generally protected by a password or key, such as a WPA (Wi-Fi Protected Access) key or Pre-Shared Key (WPA-PSK). In general, this password must be given to guests or friends that attempt accessing the wireless home network. This is often a cumbersome operation, requiring manual entry of the password, and it requires the network owner to divulge the password to the guests.

WO2015153924A1 describes a system and method to grant network access to devices that connect to a wireless access point. After having received a connection request the access point queries a social network, such as Facebook or LinkedIn, or a meeting service, such as Outlook, to authorize the access or not. Depending on the connection between the user of the connecting device and the owner of the access point the access is granted or not. The major drawback of such a method is that the owner of the gateway/access point and the owner of the connecting device need to have an account in these social networks or meeting services (e.g. outlook). The connection to the network is not possible if the user of the connecting device and the owner of the access point are not both members of the same social network or meeting service.

3. SUMMARY OF INVENTION

A purpose of the invention is to provide user devices with an access to local networks, such as Wi-Fi, Bluetooth or Ethernet network, they never visited before without requiring user interaction. According to embodiments of the invention, the authentication process may reflect the trust and/or relationship that the users have.

According to one or more embodiments of the invention, access to a given local network, called first network, is granted to a user device, referred to as a visiting user device, if the visiting device is granted access to a second network and if there exists another user device, referred to as a second user device, having access to both first and second networks. Typically, a user can access the home network of a friend if this friend has already access to the home network of the user. More generally, according to one or more embodiments the invention, a user can access the network of a friend if this friend or a friend of this friend has already access to the home network of the user.

A first aspect of the present invention relates to a method for controlling access to a first network, comprising the steps of:

receiving (S1), by a first network access device of the first network, an access request from a visiting user device, determining (S2), by the first network access device, if the visiting user device was granted an access to the first network, if the visiting device has not been granted an access to the first network, determining (S3) if there is a second network access device that granted the visiting user device an access to a second network and the second network access device is linked to the first network access device, and if the second network access device exists, granting (S4) the visiting user device an access to the first network by the first network access device, wherein the second network access device is linked to the first network access device if one of the following link conditions is met a) a different user device has been granted an access to the first and second networks by said first and second network access devices respectively, and b) at least one communication has been exchanged between the first and second network access devices.

Thus, according to one or more embodiments of the invention, the visiting device is granted an access to the first network if the visiting device is granted an access to a second network and if the second network access device is linked to the first network access device. This last condition is met if there exists a user device that has been granted access to both first and second networks through said first and second network access devices or if at least one communication has been exchanged between said first and second network access devices.

This communication may be a phone call or an electronic email.

According to a particular embodiment, the visiting device is also granted an access to the first network if the second network access device is linked to the first network access device through one or a plurality of intermediary network access devices, each of said one or a plurality of intermediary network access devices being linked to the first or second network access device when there is a user device that has been granted an access to a network by said intermediary network access device and to the first or second network by said first or second network access device.

According to a particular embodiment, when the second network access device is linked to the first network access device through n intermediary network access devices, the visiting device is granted an access to the first network only if n is lower than or equal to a predetermined number N.

According to a particular embodiment, at least two types of access to the first network comprising at least a full access and a restricted access are defined. In this embodiment, the second network access device is linked to the first network access device through n intermediary network access devices, and the visiting device is granted a full access to the first network if n is lower than or equal to a predetermined number $N_1$ and the visiting device is granted a restricted access to the first network if n is lower than or equal to a predetermined number $N_2$, with $N_1 < N_2$.

According to a particular embodiment, the visiting device is granted an access to the first network if the second network access device is linked to the first network access device, directly or through intermediary gateways, since a predefined time period.

A second aspect of the invention concerns a system for controlling access to a first network, comprising:

a plurality of network access devices for accessing a plurality of local networks, said plurality of network access devices comprising a first network access device for accessing to said first network, and an authentication server connected to said plurality of network access devices, wherein the first network access device and the server are configured to perform the following tasks when the first network access device receives an access request from a first user device called visiting device:

the first network access device determines if the visiting device has access to the first network, if said visiting device has not been granted an access, the first network access device contacts the authentication server in order to determine if there is a second network access device that granted the visiting device an access to a second network and that is linked to the first network access device, and if there is such a second network access device, the authentication server delivers an access authorization to the first network access device and the visiting device is granted access to the first network by the first network access device, wherein the second network access device is linked to the first network access device if one of the following link conditions is met:

a) there is a user device, called second user device, that has been granted access to said first and second networks by said first and second network access devices respectively, or b) at least one communication has been exchanged between said first and second network access devices.

According to a particular embodiment, the authentication delivers an access authorization if the second network access device is linked to the first network access device through one or several intermediary network access devices, each of said one or several intermediary network access devices being linked to the first or second network access device when there is a user device that has been granted an access to a local network by said intermediary network access device and to said first or second network by said first or second network access device.

According to a particular embodiment, the authentication server is configured to receive, periodically or not, from the first and second network access devices and where appropriate from the intermediary network access devices, identifiers of the user devices that have granted an access to a local network by said network access devices, the identifiers of the user devices being associated to the network access devices by which they have an access to a local network.

In one or more embodiments, the first network access device is a gateway device. In one or more embodiments, the second network access device is a gateway device.

According to a particular embodiment, the identifiers of the user devices are the MAC addresses of the user devices.

4. BRIEF DESCRIPTION OF THE DRAWINGS

The invention can be better understood with reference to the following description and drawings, given by way of example and not limiting the scope of protection, and in which.

5. DESCRIPTION OF EMBODIMENTS

Figure 1:
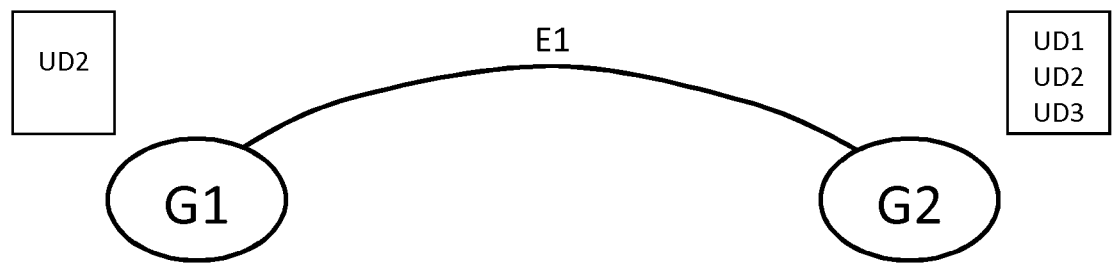
FIG. 1 is an example of a first graph describing links between gateways of networks according to an embodiment.

While example embodiments are capable of various modifications and alternative forms, embodiments thereof are shown by way of example in the drawings and will herein be described in details. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Embodiments of the invention will be described in the framework of the access control of home networks that may be accessed through home gateways. User devices, like mobile phones, laptops or pads, may access to the home networks via the home gateways.

In the following description, the term "gateway" or network access device designates an access point to a network (for example a home network) for a given user device. The user device can be a mobile phone, a laptop or a pad. The term "network" designates a set of electronic devices that are connected to one another in order to exchange data and share resources. The network can be accessed by a user device for example by providing a password or a key.

According to an embodiment of the invention, each home gateway collects identifiers of user devices that connected to the associated home network, over a Wi-Fi, Bluetooth or Ethernet connection. These identifiers are for example the MAC (Media access Control) addresses of the user devices that have an authenticated and granted access to the home network. These accesses to the home network may have been granted by several means: either by providing the WPA-PSK key, a WPS (Wi-Fi Protected Setup) method, or by the mechanism of one or more embodiments of the present invention.

The home gateway sends the list of identifiers (such as MAC addresses) of these user devices with its gateway identifier (e.g. the MAC address of the gateway) to a distant authentication server.

The authentication server collects the above information from a plurality of home gateways, for example the home gateways of one or several telecom operators. Based on this information the server builds a graph. The nodes of the graph are the home gateways. When receiving the identifiers of the different gateways, the server creates an edge between two home gateways if there exists a user device that connected to the two home gateways i.e. if a same identifier is present in the list of identifiers of the two gateways.

Thus, according to an embodiment, when a guest/visiting user device requests access to the network through a home gateway, called host gateway, without knowing, for example, the WPA PSK key, the host gateway contacts the authentication server and provides its own identifier (e.g. its MAC address) and the MAC address of the requesting user device. The authentication server searches the graph and determines if at least one home gateway that the requesting user device visited before and the host gateway are connected (linked) together by an edge. If so, the authentication server informs the host gateway that access is granted to the requesting user device.

FIG. 1 shows an example of simplified graph comprising two home gateways G1 and G2 as nodes. Three user devices UD1, UD2 and UD3 are granted access to the gateway G2. This is shown in the figure by a rectangle positioned next to the gateway, this rectangle representing the list of the user devices that are granted access to the gateway. The user device UD2 is granted access to the gateway G1. An edge E1 is created between G1 and G2 since the user device UD2 is granted access to both gateways.

According to an embodiment, if the user device UD1 requests access to the gateway G1, this access will be granted since G1 is linked to G2 by the edge E1.

Figure 2:
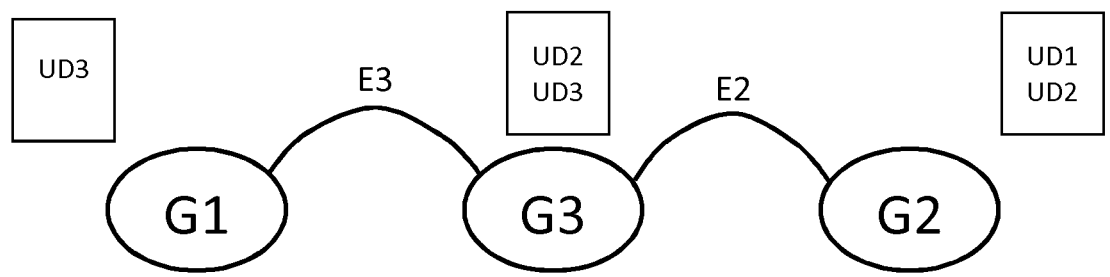
FIG. 2 is an example of a second graph describing links between gateways of networks according to an embodiment.

In another embodiment, the access is also granted if the gateways G1 and G2 are linked by several consecutive edges, which means that the gateways G1 and G2 are linked through intermediary gateways. This case is illustrated by FIG. 2. In this example, the graph comprises three gateways G1, G2 and G3 as nodes. The user devices UD1 and UD2 are granted access to the gateway G2, the user devices UD2 and UD3 are granted access to the gateway G3 and the user device UD3 is granted access to the gateway G1. An edge E2 is created between G2 and G3 since the user device UD2 is granted access to these two gateways. An edge E3 is created between G1 and G2 since the user device UD3 is granted access to these gateways.

According to an embodiment, if the user device UD1 requests access to the gateway G1, this access will be granted since G1 is linked to G2 by the consecutive edges E2 and E3.

In a particular embodiment, the number of consecutive edges is limited to a predetermined number M. The access will not be granted if the number of consecutive edges is greater than M. It means that the access is not be granted if the number of intermediary gateways is greater than N=M−1.

In a particular embodiment, the access type is determined based on the number n of intermediary gateways (i.e. the number m=n+1 of consecutive edges) in the graph. For example, two access types can be defined: a full access and a restricted access. In a full access, a visiting user device has accessed to the same functionalities than the owner of the local network and, in a restricted access, the visiting device has accessed to only a part of them. In this particular embodiment, the visiting device is granted a full access if the number n of intermediary gateways in the graph is lower than or equal to $N_1$ and a restricted access if the number n of intermediary gateways in the graph is lower than or equal to $N_2$, with $N_1 < N_2 = N$. For example, $N_1 = 1$ and $N_2 = 3$.

In a particular embodiment, the graph is periodically recomputed and an edge is kept between two gateways only if there is a user device that connected to both gateways since a predefined time period, e.g. during the last month or the last week. To this end, the home gateway sends, together with the list of identifiers that have been granted access, the access date for each identifier of the list. In that case, the "old" edges are not kept in the graph.

Figure 3:
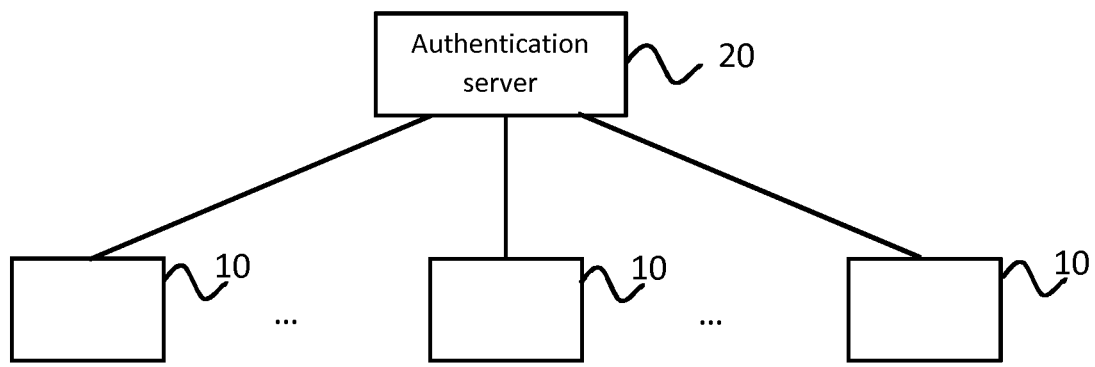
FIG. 3 is a schematic view of the global architecture of a system according to an embodiment.

FIG. 3 illustrates a system according to an embodiment of the invention. The gateways 10 of a plurality of local networks are connected to an authentication server 20.

Each gateway collects identifiers of the devices that connected to the associated local network. These identifiers are sent to the server 20 periodically or when a user requests access to the local network. Then the authentication server 20 builds a graph based on these identifiers.

When a user device requests an access to a given local network without using a dedicated key such the WPA-PSK key, the associated gateway (first gateway) contacts the server and sends the identifier of the user device and its identifier to the server 20 in order to determine if there is a second gateway to which the user device is granted access and that the second gateway is linked to the first gateway. The server 20 searches the graph in order to determine if there is a second gateway to which the user device is granted access and if the second gateway is connected to the first gateway by an edge or a plurality of consecutive edges. If so, the server answers to the first gateway that the user device can access to the local network.

In one embodiment, the first gateway may download a copy of the graph and accessing information from the server 20 and determine from the graph if there is a second gateway to which the user device is granted access and that the second gateway is linked to the first gateway.

As mentioned before, the identifiers of the user devices or the gateways are, for example, the MAC addresses of these devices.

In another embodiment, other identifiers can be used. The identifier can be, for example, an identifier of a SIM card, e.g. IMSI (International Mobile Subscriber Identity), authenticated by an EAP protocol, e.g. EAP-SIM (Extended Authentication Protocol—Subscriber Identity Module) or EAP-AKA (Extended Authentication Protocol—Authentication and Key Agreement). These identifiers are authenticated when the user devices connect to a local network.

In an alternative embodiment, the server creates an edge between two home gateways (indicating that the two home gateways are linked) if at least one communication has been exchanged between the two home gateways. The communication is for example a phone call or an electronic mail.

In this embodiment, the edges are created based on phone calls and email information available on servers of the telecom operators. The authentication serves builds the graph based on these information.

In another embodiment, an edge is created only if a plurality of phone calls or emails have been exchanged between the two gateways. For example, an edge is created if at least n communications are exchanges, with n>2.

In another embodiment, an edge is created if the communications are in both directions (phone calls or emails come from both gateways) and if these communications are regular (for example, at least one phone call or email every month or every week).

Figure 4:
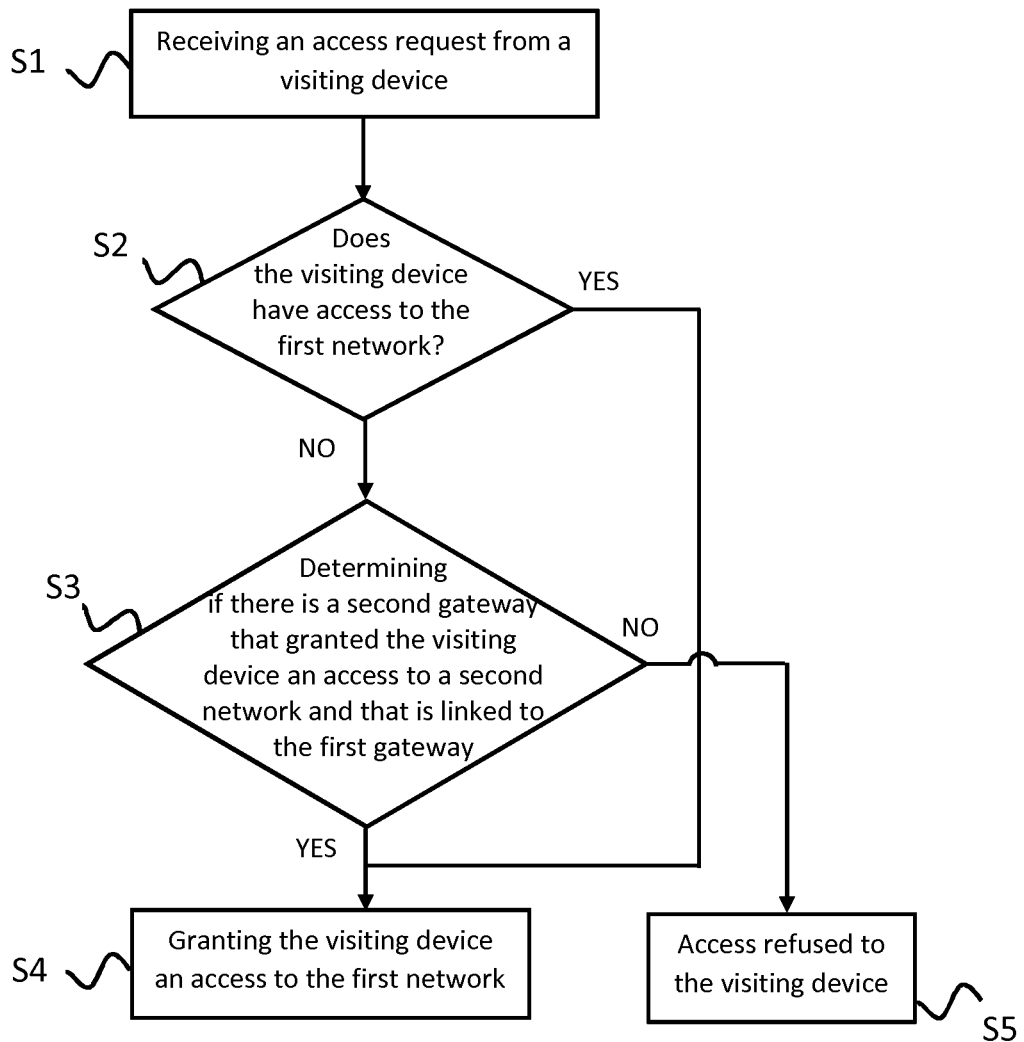
FIG. 4 is a flow chart illustrating the steps of the method according to an embodiment.

FIG. 4 is a flow chart illustrating the steps of an embodiment.

In a first step S1, the first gateway, as an example of a network access device, of the first network receives an access request from a visiting user device (the first user device).

In a second step S2, the first gateway determines if the visiting device has access to the first network. If so, the access is granted.

In a third step S3, if the visiting device has not been granted access, the first gateway contacts the authentication server 20 in order to determine if there is a second gateway, also as an example of a network access device, that granted the visiting device an access to a second network and the second gateway is linked to the first gateway. The authentication server searches the graph. It determines if there is a second gateway that granted the visiting device an access to a second network by reading the list of identifiers associated to each gateway and the second gateway is linked to the first gateway by an edge or, in a particular embodiment, by successive edges.

As mentioned above, the first gateway may download a copy of the graph and accessing information from the server 20 and determine from the graph if there is a second gateway to which the user device is granted access and that the second gateway is linked to the first gateway.

If a second gateway linked to the first gateway is found, the first gateway is configured to grant the visiting device an access to the first network in a step S4. Otherwise, the access is refused at step S5.

Figure 5:
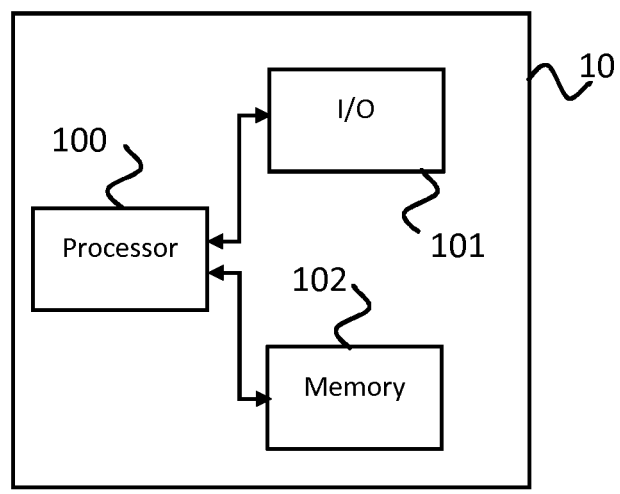
FIG. 5 is an illustrative schematic view of a gateway receiving an access request.

FIG. 5 is a schematic view of a first gateway. The first gateway 10 includes a processor 100 (e.g. a central processing unit (CPU) or other suitable processor(s)), a memory 102 (e.g. random access memory (RAM), read only memory (ROM), and the like) and one or more input/output devices 101 in order to communicate with the authentication server. The exemplary steps shown in FIG. 4 are executed by the processor 100.

The memory 102 may represent both a transitory memory such as RAM, and a non-transitory memory such as a ROM, a hard drive, a CD drive, a Blu-ray drive, and/or a flash memory, for processing and storing different files, data and information as necessary, including computer program products and software (e.g., as represented by a flow chart diagram of FIG. 4), a copy of the graph from the authentication server 20, identifiers of user devices, and etc., as needed.

By virtue of the embodiments of the invention, a user device can access a local network even if it does not provide the dedicated password or key.

Although some embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method for controlling access to a first network, comprising:
    receiving, by a first network access device of the first network, an access request from a first user device;
    determining, by the first network access device, if the first user device was granted an access to the first network;
    if the first user device was not granted an access to the first network, determining, if a second network access device linked to the first network access device granted the first user device an access to a second network; and
    if the second network access device granted access to the first user device, granting the first user device an access to the first network by the first network access device;
    wherein the second network access device is linked to the first network access device if the second network access device is linked to the first network access device through at least one intermediary network access device;
    wherein when the second network access device is linked to the first network access device through at least one intermediary network access device, the first user device is granted an access to the first network on a condition that a number n of intermediary network access devices is lower than or equal to a predetermined number N.

2. The method according to claim 1, wherein the communication exchanged between said first and second network access devices is a phone call or an electronic mail.

3. The method according to claim 1, wherein at least two types of access comprising at least a full access and a restricted access to the first network are defined and the second network access device is linked to the first network access device through n intermediary network access devices, and wherein the first user device is granted a full access to the first network on a condition that n is lower than or equal to a predetermined number N1 and the first user device is granted a restricted access to the first network on a condition that n is lower than or equal to a predetermined number N2, with N1<N2.

4. The method according to claim 1, wherein the first user device is granted an access to the first network on a condition that the second network access device is linked to the first network access device since a predefined time period.

5. A non-transitory program storage device readable by machine, tangibly embodying a program of instructions executable by the machine to perform program steps of claim 1.

6. A first network access device for controlling access to a first network, comprising:
    a memory storing software; and
    a processor configured to receive an access request from a first user device;
    determine if the first user device was granted access to the first network;
    if the first user device was not granted an access to the first network, the processor being configured to determine if a second network access device linked to the first network access device granted the first user device an access to a second network;
    if the second network access device granted access to the first user device, the processor being configured to grant the first user device an access to the first network;
    wherein the second network access device is linked to the first network access device if the second network access device is linked to the first network access device through at least one intermediary network access device;
    wherein when the second network access device is linked to the first network access device through n intermediary network access devices, the first user device is granted an access to the first network on a condition that n is lower than or equal to a predetermined number N.

7. The first network access device according to claim 6, wherein the communication exchanged between the first and second network access devices is a phone call or an electronic mail.

8. The first network access device according to claim 6, wherein at least two types of access comprising at least a full access and a restricted access to the first network are defined and the second network access device is linked to the first network access device through an intermediary network access device, and wherein the first user device is granted a full access to the first network on a condition that n is lower than or equal to a predetermined number N1 and the first user device is granted a restricted access to the first network on a condition that n is lower than or equal to a predetermined number N2, with N1<N2.

9. The first network access device according to claim 6, wherein the first user device is granted an access to the first network on a condition that the second network access device is linked to the first network access device since a predefined time period.

10. A gateway comprising the first network access device according to claim 6.

* * * * *